Patented Jan. 18, 1927.

1,615,193

UNITED STATES PATENT OFFICE.

WILLIAM C. PIVER, OF HILLSIDE, NEW JERSEY, ASSIGNOR OF ONE-HALF TO WILLIS H. SIMPSON, OF EAST ORANGE, NEW JERSEY.

METHOD OF MAKING ARSENIC ACID.

No Drawing.   Application filed February 21, 1923.   Serial No. 620,506.

This invention relates to a method of making arsenic acid; and comprises a novel, inexpensive process for the treatment of arsenical vapors with an oxidizing agent to form arsenic acid.

The various steps contemplated in the method of production consist of heat treatment applied to any compound containing arsenic, whereby the arsenic content is volatilized, forming arsenic trioxide, and the further treatment of the volatilized arsenic trioxide with an acid oxidizing agent to form arsenic acid.

I prefer to employ in the process, ores containing arsenic, although the results desired may be accomplished equally as well through the use of pure or impure arsenic trioxide, metallic arsenic, or in fact any compound containing arsenic from which the arsenic may be volatilized by heating.

For the purpose of oxidizing the volatilized arsenic tri-oxide, I prefer to use water in the form of steam or fine mist and nitric acid in vapor or mist form, although chlorine or oxides of nitrogen can also be used instead of nitric acid.

A specific illustration of the method is given as follows: An ore containing arsenic, after having been milled to the requisite degree of fineness, is heated or roasted in a suitable furnace. At a dull red heat the arsenic content is rapidly volatilized, although it will be found that some gases are released at lower temperatures. The released arsenic vapors, which are in the form of the trioxide, are subsequently subjected to a purifying process, such as settling, filtering and cooling, the temperature being kept above the condensation point, however, throughout the treatment, or any approved process depending on the grade and character of ore employed.

When an arsenic ore is used, the trioxide is formed by roasting, the necessary amount of air being admitted to obtain the reaction. If impure arsenic trioxide material is used, the arsenic is already present as arsenic trioxide and less air is required. In either case, the volatilized arsenic trioxide is treated with an excess of air, to dilute the vapor, which is then conducted into settling chambers for purification. At this point the trioxide gas is introduced into a suitable tower through which air, water vapor, and nitric acid in mist form are circulated. The arsenic trioxide gas thereby coming in contact with the nitric acid mist a reaction takes place by which the nitric acid is decomposed into oxygen, and nitrogen oxides, and the free oxygen thus produced is taken up by the arsenic trioxide to form arsenic acid. The hydrogen is supplied by either the water or the nitric acid, possibly from both.

The arsenic acid thus formed is continuously circulated through the tower, with air, water, and nitric acid, and as more nitric acid is produced from the nitrous oxides, air, and water present, a continuous production and concentration of arsenic acid results. When the desired concentration has been reached the arsenic acid is removed from the system.

The system preferably comprises a plant of a series of towers through which the various agents are circulated. There is considerable temperature present at all times, due to the heated vapors being introduced and circulated through the towers, and before the vapors can possibly condense they are acted upon by the oxidizing agents with which the arsenic trioxide gas or vapor is brought into contact, as explained. If desired, any nitric acid present in the resultant arsenic acid drawn from the system, may be eliminated by further treatment of any approved form.

While in this specific representation of the method employed I have described certain materials and steps of the process, I desire it to be understood that I do not intend to limit myself to such, but that any requisite changes therein may be employed as will fall within the scope of the invention as claimed.

I claim:—

1. A method of making arsenic acid comprising the volatilization of arsenic content in arsenic ores by heat in the presence of air to form an oxide of arsenic vapor, and subsequent treatment of the resultant vapor to form arsenic acid.

2. A method of making arsenic acid comprising heating an arsenical ore to vaporize the arsenic content, diluting and combining the vapor with an oxidizing agent in the presence of water vapor to form arsenic acid.

3. A method of making arsenic acid comprising combining arsenic trioxide in a gaseous state with oxidizing agents in the presence of water vapor to form arsenic acid.

4. A method of making arsenic acid comprising combining volatilized arsenic trioxide in the presence of water vapor with a gaseous oxidizing agent.

5. A method of making arsenic acid by which the volatile arsenic trioxide gas resulting from the treatment by heat of an arsenical ore in the presence of air is oxidized in the presence of nitric acid and water vapor to a higher oxide to form arsenic acid.

Signed at New York in the county of New York, and State of New York this 13th day of Feb., A. D. 1923.

WILLIAM C. PIVER.